No. 804,161. PATENTED NOV. 7, 1905.
W. NOLES.
FILTER.
APPLICATION FILED MAR. 8, 1905.
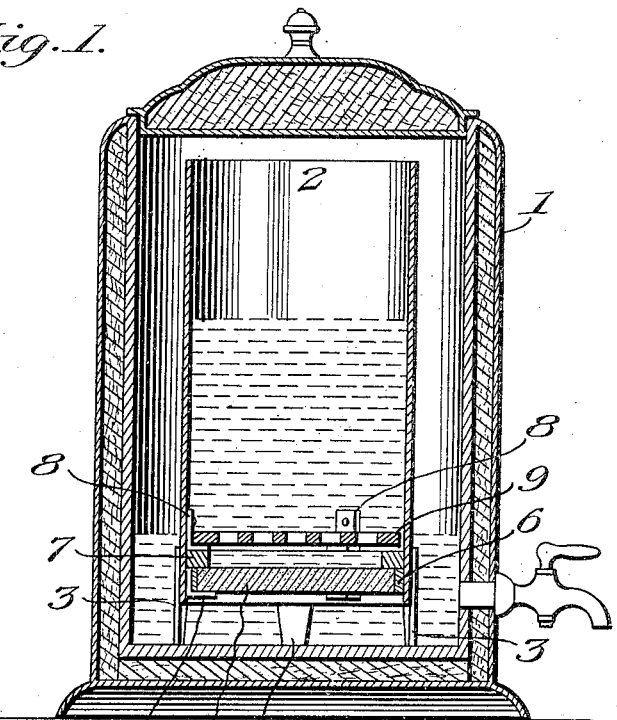
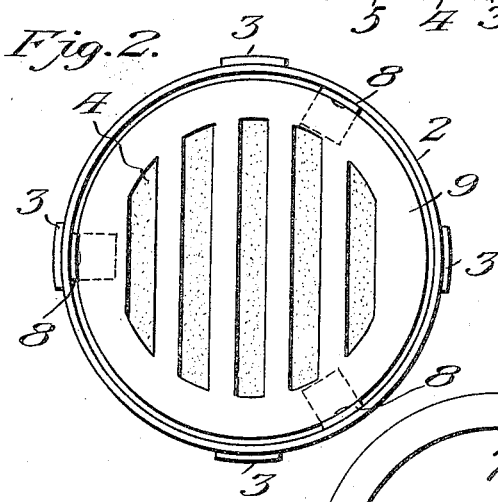
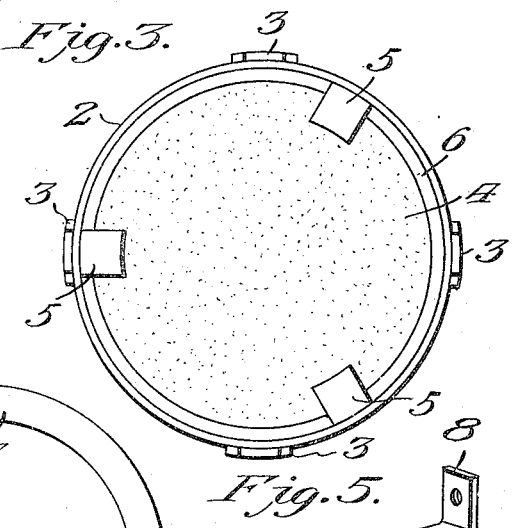
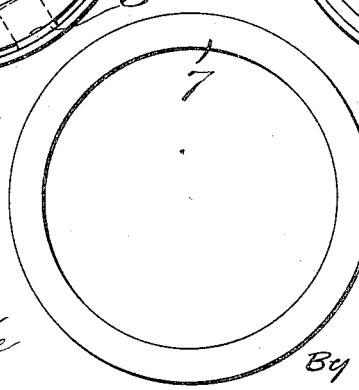
Witnesses
Edwin G. McKee
W. H. Clarke.
Inventor
Wilson Noles
By Victor J. Evans
Attorney

UNITED STATES PATENT OFFICE.

WILSON NOLES, OF MONTROSE, IOWA.

FILTER.

No. 804,161. Specification of Letters Patent. Patented Nov. 7, 1905.

Application filed March 8, 1905. Serial No. 249,087.

*To all whom it may concern:*

Be it known that I, WILSON NOLES, a citizen of the United States of America, residing at Montrose, in the county of Lee and State of Iowa, have invented new and useful Improvements in Filters, of which the following is a specification.

This invention relates to filters.

The objects of the invention are to improve and simplify the construction of such devices; furthermore, to prevent the porous filtering medium from becoming broken by the use of ice.

With the foregoing and other objects in view, which will appear as the description proceeds, the invention resides in the combination and arrangement of parts and in the details of construction hereinafter described and claimed as a practical embodiment thereof.

In the accompanying drawings, forming part of this specification, Figure 1 is a vertical section of a water-cooler and a filter constructed in accordance with the invention. Fig. 2 is a plan view of the filter. Fig. 3 is an under plan view of the filter. Fig. 4 is a detail view of the spacing-ring. Fig. 5 is a detail view of a bracket for holding the filtering member in position.

Like reference characters indicate corresponding parts in the different figures of the drawings.

Referring to Fig. 1, the reference-numeral 1 indicates a water-cooler, which may be of any suitable form and construction.

The improved filter of this invention is adapted to be placed inside the cooler 1, as shown in Fig. 1. The filter comprises a stand-pipe 2, which is open at its upper end and is provided at its lower end with legs 3. The lower end of the stand-pipe 2 is closed by means of a porous filtering member 4, which is held securely in position by means of brackets 5. Disposed between the periphery of the porous member 4 and the stand-pipe 2 is a ring 6, of solder or cement, which serves to cause all the water in the filter to pass through the porous member 4. Resting upon the upper surface of the porous member 4 is a spacing-ring 7, which is held in position by means of brackets 8. A grating 9 rests loosely upon the brackets 8.

The function of the grating 9 is to prevent the porous member 4 from becoming broken by lumps of ice which may be dropped into the stand-pipe 2.

Changes in the precise embodiment of invention illustrated and described may be made within the scope of the following claim without departing from the spirit of the invention or sacrificing any of its advantages.

Having thus described the invention, what is claimed as new is—

The combination with a water-cooler, a filter fitted therein, said filter comprising a stand-pipe having legs, a porous filtering member in the lower end of said stand-pipe, brackets for holding said porous member in position, a spacing-ring resting upon said porous member, brackets for holding said spacing-ring in position, and a grating removably supported upon said last-mentioned brackets.

In testimony whereof I affix my signature in presence of two witnesses.

WILSON NOLES.

Witnesses:
E. WAHRER,
LOUISE W. STANWOOD.